UNITED STATES PATENT OFFICE.

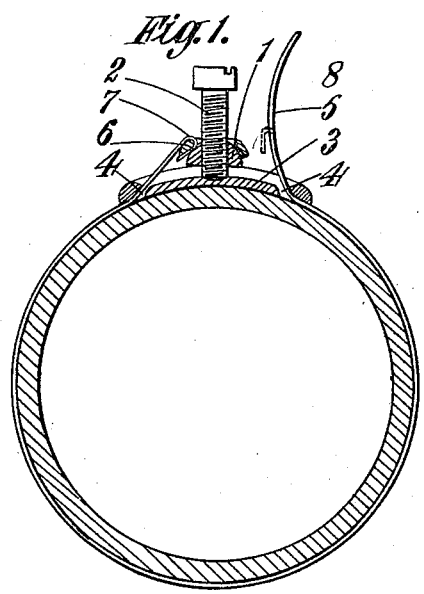
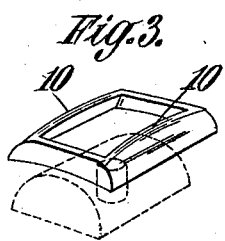
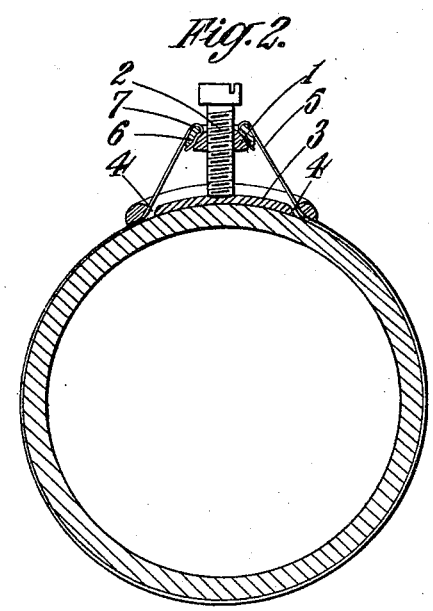
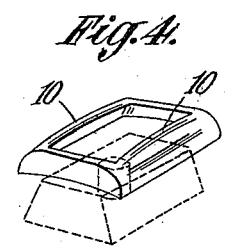
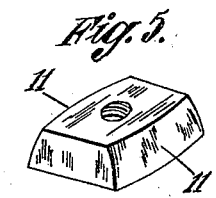

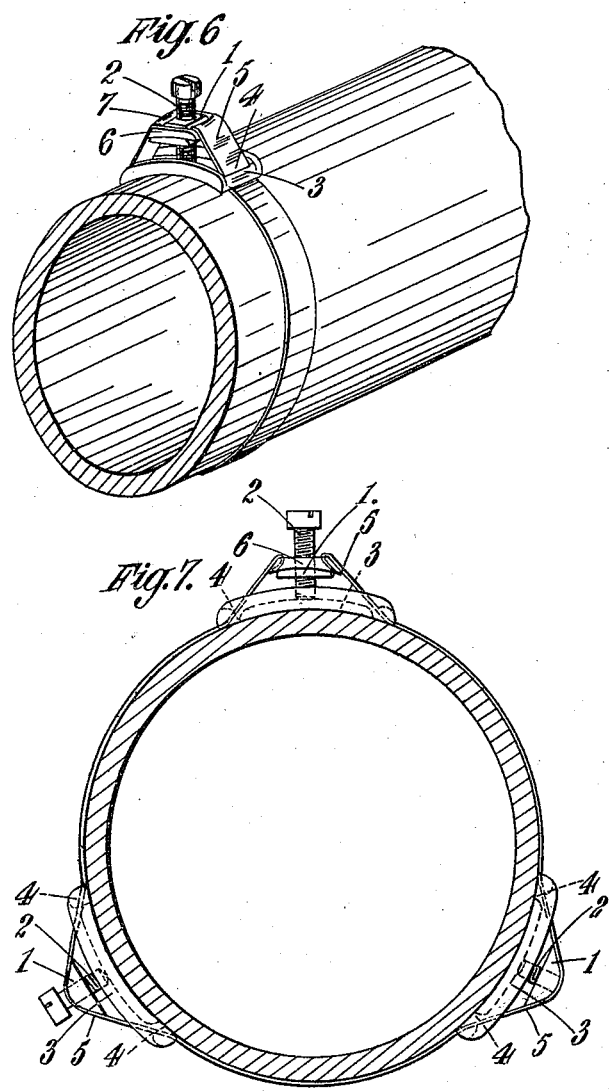

CHARLES I. LOPDELL, OF SURBITON, ENGLAND.

BAND CLIP.

1,412,189.  Specification of Letters Patent.  Patented Apr. 11, 1922.

Application filed August 27, 1921. Serial No. 496,157.

(GRANTED UNDER THE PROVISIONS OF THE ACT OF MARCH 3, 1921; 41 STAT. L., 1313.)

*To all whom it may concern:*

Be it known that I, CHARLES IEVERS LOPDELL, a subject of the King of Great Britain, and resident of 2 Westfield Place, Surbiton, in the county of Surrey, England, have invented certain new and useful Improvements in Band Clips, (for which I have filed an application for patent in England, No. 160,658, dated March 12, 1920, and an application for patent in France dated February 2, 1921,) of which the following is a specification.

This invention relates to band clips or clamping devices such as are used for securing hose pipes to metal piping and for a variety of similar purposes. It is the object of this invention to provide an improved clip of this character. According to the prevent invention a band clip is provided wherein the band only requires to have plain inwardly hooked ends for engaging purposes. The ends of the band are folded inwardly between a nut and collar which are so formed that the latter fits over the former, the gripping sides of the nut being chamfered or curved at its gripping faces while the collar is shaped to correspond. With this arrangement gripping and tightening of the ends of the band take place with increasing intensity as the nut is drawn up against the collar by a screw bearing centrally against a bridge piece. This arrangement also has the advantage that bands with plain ends can be used, the user bending over the free end of the band for gripping purposes if desired, so that the length of the band for gripping purposes is adjustable within the limits of size for which the clip is applicable. The new construction is adapted to enable a single comparatively narrow and plain band to be tightened on an article such as a hose pipe joint, without risk of slipping of the band, while allowing of detaching and re-applying the clip at any time if desired.

The accompanying drawings show various constructions of the clip according to the present invention. In the said drawings:—

Figure 1 is a sectional elevation of one form of clip, and shows the clip with one end only of the band in engagement between the nut and collar.

Figure 2 is a similar view to Figure 1 but shows the clip gripping and tightened up.

Figure 3 is a perspective view showing one form of nut and collar.

Figure 4 is a perspective view of another form of nut and collar.

Figure 5 is a perspective view of another form of nut.

Figure 6 is a perspective view of a clip provided with a nut as shown in Figure 5.

Figure 7 is a sectional elevation of a form of construction of clip for use on joints of large diameter.

Figure 8 is a detail view in perspective of part of Figure 7.

In the construction shown in Figures 1 and 2 of the drawings, a nut 1 with plain chamfered or rounded side faces is used, working on a screw 2 which bears on a bridge 3 having slots at 4 therein through which the band 5 is passed, the ends of the band 5 being engaged from the outside inwardly over a ring or collar 6 of metal, the size of which is such that it will pass over the narrowed upper end of the nut member 1. One end 7 of the band 5 is generally bent permanently around one side of the collar 6 while the other end may be left plain, or already formed with an inwardly directed hook for engaging with the other side of the collar. If the end is left plain, it is cut off to a suitable length for example at 8 (Figure 1), and this end is bent over inwardly as shown in dotted lines in Figure 1, hooked over the collar 6, and the nut is tightened by means of the screw 2 so that the inwardly hooked ends of the band are gripped between the side faces of the nut and the collar as shown in Figure 2. The pull on the band tends to pull down the collar and to cause it to grip the hooked ends of the band still more tightly against the faces of the nut.

There is a tendency with the band gripped in this manner, for it to pull downwardly the middle portions of the sides of the collar, and thus to stretch or strain the edges of the band where it passes over the collar; in cases where a strong gripping pressure has to be applied, this may cause tearing of the band. In order to avoid this, the sides of the collar may be arched upwards slightly as shown at 10 in Figures 3 and 4 so that the pull on the band when it is gripped first tends to come on its centre line, and the increasing tension will then tend to pull down and straighten out the sides of the collar. In this way the tension across the section of the band may be made such that there is no increased strain at its edges, and no tendency to initiate a tearing action there. A similar result may be secured by making the chamfered faces of the nut with a slight outward bend or bulge in the middle as shown in Figure 5. The collar 6 then causes the gripping of the band to take place first about the middle of the outwardly curved surface at 11, whereupon the collar itself becomes bent slightly until the edges of the band are gripped tightly also, as will be seen from Figure 6 which shows a clip provided with a nut of the kind shown in Figure 5. As the collar becomes distorted to a curved form to fit the coned surface of the nut, the ends of the band are curved or kinked transversely as seen in Figure 6, and thus prevented from straightening out. The security of the engagement is therefore increased in this case. This result is attained whenever a nut having outwardly curved and chamfered side faces is used, with a collar which can be distorted under tension to lie around the curved faces of the nut.

Figure 7 shows a form of construction of clip for use with joints of large diameter. It will be realized that when a clip of the character described is to be applied to a pipe or hose of large section, if the length of band is so chosen that its free end can be engaged easily by hand with the collar 6, the length of the band which would have to be drawn out by the screw 2 in order to apply sufficient tension for gripping purposes might often be excessive, and the grip would be unreliable in action, while the pressure probably would not be evenly distributed around the circumference of the pipe or the like. The construction of Figure 7 overcomes both of these difficulties by the provision of additional means for taking up the length in the band so that the clip engaged by the ends of the band only needs to have a reasonably small adjustment for tightening purposes. Figure 7 shows a clip suitable for a large hose piping such as is used in oil pipe lines, and it includes two additional tensioning devices; it will be understood, however, that one only of these, or more than two may be used according to circumstances. Each additional tensioning device consists of a bridge member 3 through holes 4 in which the band is threaded, while a screw 2 passing through a rounded nut 1, and through a hole or slot cut in the centre line of the band 5, serves to apply the tension. The two additional tensioning devices and the clip with which the ends of the band engage are preferably spaced at equal angular distances apart around the joint so that they can be used equally for tensioning the band and making the pressure approximately even around the whole circumference of the joint. It will be realized that the additional tensioning devices may have the bridge 3, screw 2 and nut 1 identical in form with those used in the clip for the ends of the band, the only difference being that the collar 6 is not needed where the band is continuous and can bear directly on the nut 1 as shown. The provision of further tightening devices around the band enables a sufficient free length to be left at the end of the band for ease in engaging it with the clip, and thereafter this free length can be taken up while distributing the pressure evenly around the joint.

With this construction the several pulls on the band 5 are effected over a portion only thereof, and as the curvature of each of these portions is relatively small, decreasing as it does as the size of the clip increases, a strong grip is obtained around the whole joint. When the clip is used upon oil pipe lines, and when the joint is more or less permanent, the heads of the screws 2 may be cut off flush with the nuts 1 as indicated on one of the tightening devices in Figure 7 and in perspective in Figure 8.

In all the constructions according to the invention, the clip is readily detachable at any time unless the heads of the screws are cut off as explained with reference to Figure 8, and the band can therefore be released and applied again as often as may be required.

Having thus described my invention what I claim as new and desire to secure by Letters Patent is:—

1. A band clip device of the type described, comprising a band member, a bridge piece formed with slots through which the band can pass, said bridge piece being shaped to a curvature corresponding approximately to the curvature of the article to which the clip is to be applied, a screw bearing centrally upon said bridge piece, a nut on said screw, and a collar adapted to fit over said nut, the ends of said band member being bent over inwardly for engaging purposes in such manner that they engage over the collar and their inwardly turned ends are adapted to be gripped between said nut and collar when the nut is drawn outwardly by turning said screw.

2. A band clip as claimed in claim 1, the nut whereof has inclined outer faces, and the collar whereof has its inner faces inclined to correspond with the inclined faces of said nut.

3. A band clip as claimed in claim 1, the collar whereof has the sides over which the inwardly turned ends of the band engage raised at the centre in such manner that the pull on the band during gripping takes place first at the centre line thereof.

4. The combination with a band clip device as claimed in claim 1, of additional tightening means in the length of the band comprising an additional bridge piece formed with slots through which the band passes, a screw bearing centrally on said additional bridge piece and passing through an aperture in said band, and a nut on said screw between said additional bridge piece and the band.

CHARLES I. LOPDELL.